Patented Nov. 4, 1952

2,616,150

UNITED STATES PATENT OFFICE 2,616,150

REFRACTORY MATERIAL AND PROCESS OF MAKING THE SAME

Arthur W. Vettel, Watsonville, Calif., assignor to Kaiser Aluminum & Chemical Corporation, Oakland, Calif., a corporation of Delaware No Drawing. Application August 14, 1950, Serial No. 179,370

12 Claims. (Cl. 25—157)

This invention relates to the production of deadburned dolomite; and, more particularly, to the production of discrete agglomerates thereof from finely divided initial materials.

Highly fired dolomite, known as deadburned dolomite, has long been known as a desirable material for lining of furnaces in iron and steel production. It has been the practice to crush raw dolomite rock to desirable sizes, suitably passing a one-inch screen and retained on a 20-mesh screen or larger; and then to fire the crushed dolomite with the addition, preferably, of an iron fluxing material such as mill scale. During the firing of such material, particularly in rotary kilns, considerable dust-formation occurs. This is due to several causes including decrepitation of the ore, the driving off of $CO_2$ at a fairly rapid rate, and abrasion of the particles as they roll or rub against each other and against the walls of the furnace. These fine dusts go off with the flue gases and are a nuisance in many areas, if permitted to issue from the stacks and deposit on the surrounding territory. In most cases, therefore, the dusts are collected by various means, one of the most common being the Cottrell precipitator.

Heretofore, this recovered dust has represented waste in these operations because it has necessarily been discarded. Attempts to feed such fine dusts to the rotary kiln either have been ineffective, or have resulted in the building up of hard rings in the kiln, the latter necessitating shut-down, or specially constructed apparatus, for removal thereof. The same has been true of the fines formed in grinding or crushing raw dolomite for feeding to the kiln, and utilization of all of these fines and dusts has been industrially impracticable because of high cost, inefficiency, and apparatus required.

Furthermore, in the production of deadburned dolomite, slaking upon exposure to air, and disintegration, are important disadvantages of a high-purity product. To overcome these effects, higher amounts of silica and iron have been added, which leads to lowered refractoriness; or, alternatively and more usually, the fired material is coated with a wax or hydrocarbon, which is a further expense both as to material and operation.

According to the present invention it has now been discovered that finely divided starting materials can be utilized in making deadburned dolomite of improved stability in air and towards moisture. In the present method, finely divided dolomite from any source is mixed with a small amount of finely divided iron oxide, and with a small amount of finely divided bonding agent which is magnesia or a mixture of calcined dolomite and magnesia. The admixture so prepared is formed into shapes, for instance, it is nodulized while spraying with water or a water-solution of magnesium chloride or magnesium sulfate, or both, or with other liquid binders; and the nodules obtained are treated with carbon dioxide at moderately elevated temperatures, whereupon they become very hard and strong. They are then charged to a furnace, for example, a rotary kiln and are fired to the deadburned state. The nodules so prepared withstand well the firing operation without formation of a substantial amount of dust and fines.

The dolomite starting material is of a particle size substantially all passing through a 20-mesh screen (0.84 mm.) and preferably at least 50% passing 200 mesh (74 microns). The starting material can be ground to these sizes but it is especially advantageous to employ as such starting dolomite, fines which are produced in crushing and grinding dolomite for other operations and dusts recovered from the stack gases issuing from furnaces in which raw dolomite is being calcined or fired. These finely divided dolomites are in suitable state for use in the process. The dusts recovered from the stack gases are approximately comparable in chemical composition, including ignition loss, to raw dolomite; and it may be that the very fine particles carried out of the calcining or firing zone in a current of stack gas having a considerable $CO_2$ content are thereby recarbonated prior to their recovery in the dust collection system.

The iron oxide added is preferably in the form of pyrites sinter or mill scale, but other forms of iron oxide can be added, or there can be added an iron compound which decomposes upon heating to form iron oxide, such as pyrites or iron carbonate. It is also finely divided, preferably at least 90% of the particles passing through a 100-mesh screen (149 microns). From about 5% to 10% of the iron oxide is added, based on the total weight of the fired product, and preferably from about 6.0% to about 7.0% is employed.

As a binder there is added finely divided active magnesia in an amount of from about 3.5% to about 7.5% of the total weight of the fired product. Calcined dolomite can be employed as substitute for some of the active magnesia, but at least 3.5% of active magnesia should always be used. Preferably, about 6.0% of magnesia is employed to form nodules of excellent strength and hardness; but very good results can also be obtained by adding, as binder, 3.5% magnesia and 2.5% calcined dolomite. The binder is finely divided also, and is preferably of such particle size that at least 80% passes through a 200-mesh screen. The magnesia can be of caustic grade; but an especially useful magnesia is that calcined to an iodine number of from about 15 to about 30 (measured as described in "Adsorption," by C. L. Mantell, at page 346), which has been found to yield strong nodules and also to mix in well, setting up sufficiently slowly that uniform admixtures are very easily obtainable.

The dolomite, iron oxide and magnesia binder ingredients are mixed, in either a batch or continuous manner, and are formed into shapes preferably with from 15% to 20% water. Preferably this is effected by feeding the material into a nodulizer, or rotating drum. As the drum rotates, the material rolls about and is sprayed with water or with a solution of a binding agent such as magnesium chloride, magnesium sulfate, molasses, waste sulfite liquor, etc. Nodules are thereby formed which are usually from about one-fourth inch to five-eighths inch in diameter. The shaped product is then treated, at a moderately elevated temperature, for example, at from about 60° C. to about 300° C., or preferably at from about 60° C. to about 250° C., with carbon dioxide or a carbon dioxide-containing gas. Suitably, a gas is employed which contains at least 12% of carbon dioxide. Advantageously, a gas mixture containing from 12% to 28% of carbon dioxide is employed. Gases containing higher ratios of $CO_2$ are useful but more costly. A preferred gas for this step is stack gas issuing from a zone where dolomite is being calcined and containing about 25% carbon dioxide. This treatment can be suitably carried out by forming a bed of the shapes or nodules on a wire belt conveyor whereby the gas can freely pass through the bed of dolomite. Curing is preferably carried out for about one hour.

The shapes or nodules so cured are strong and hard and can be fed directly to a rotary, or other, kiln for firing. Firing temperatures are preferably from about 1650° C. to about 1800° C., but a lower firing temperature can be employed for a longer time, or a higher temperature, for a shorter time.

It is a particular advantage of the process of this invention that no silica is admixed, and the cold binding action is obtained by the addition of the active magnesia. In this manner, refractoriness of the ultimate product is maintained at a maximum, which is of particular importance in present-day steel-making techniques where the tendency is to use ever-increasing working temperatures. It is a further advantage of this invention that deadburned dolomite produced in this manner has greatly improved stability toward air and moisture. No slaking is exhibited by nodules so made, after standing in air for several weeks. If it is desired to hold them for a longer time or under very severe conditions, it may be preferred to protectively coat with oil or hydrocarbon also, but less will be required than with the deadburned dolomite of the prior art. Another advantage is that nodules or shapes prepared in this manner can be deadburned in a rotary kiln without formation of rings in the kiln.

The following example will demonstrate more clearly the method of the present invention.

*Example*

92.01 tons of dust recovered in a Cottrell precipitator from stack gases issuing from a rotary kiln wherein raw dolomite rock is being calcined, are mixed with 2.03 tons of iron pyrites sinter, 2.03 tons of magnesia having an iodine number of 15.0, and 1.47 tons of calcined dolomite. The Cottrell dust has the following particle size distribution: 0.4% passing 10 and retained on 14 mesh, 0.3% passing 14 and retained on 20 mesh, 18.4% passing 20 and retained on 65 mesh, 19.2% passing 65 and retained on 100 mesh, 29.8% passing 100 and retained on 200 mesh, and 31.9% passing 200 mesh. The chemical analysis of this dust on the ignited basis is as follows: 2.11% $SiO_2$, 3.97% $Fe_2O_3$, 0.34% $Al_2O_3$, 57.60% $CaO$ and 35.98% $MgO$ (the dust having 42.17% ignition loss). The iron pyrites sinter contains 91% to 92% $Fe_2O_3$ and 90% of the sinter passes 100 mesh. The calcined dolomite and magnesia are of such sizes that 80% passes 200 mesh. These ingredients are thoroughly admixed in a pan type mixer or other suitable mixing device; if more milling is desired, they can be mixed in a ball mill, for example.

The admixture is fed to a nodulizing drum where it is sprayed with water at the rate of 35 gallons per ton of feed. Nodules issuing from the drum are fed onto a three-eighths inch wire screen conveyor, and stack gases are passed through the screen and the bed of nodules thereon. In this example, the stack gases contain 25% $CO_2$ and the temperatures range from 60° C. at the feed end of the conveyor at 300° C. at the discharge end. The nodules are retained in the gas stream for one hour, and at the end of that time have a bulk density of approximately 90 pounds per cubic feet and moisture content of about 10%. The nodules are then fed to a rotary kiln and deadburned, at a temperature of 1800° C. The deadburned product exhibits the following screen analysis: 5.7% retained on 0.525 inch mesh; 5.9% passing 0.525 and retained on 0.441 inch mesh; 36.7% passing 0.441 inch and retained on 3 mesh; 49.0% passing 3 and retained on 8 mesh; 2.2% passing 8 and retained on 10 mesh; 0.3% passing 10 and retained on 20 mesh; and 0.2% passing 20 mesh.

If desired, the nodules or other formed shapes can be fired together with raw dolomite rock.

The screen measurements are expressed herein in terms of U. S. Bureau of Standards screens. In conformity with common practice in reporting chemical analyses of materials of the kind here considered in the specification and claims the proportions of the various chemical constituents present in a material are given as though these constituents were present as the simple oxides. For instance, the iron constituent is referred to as iron oxide or $Fe_2O_3$, the magnesia constituent as magnesia, magnesium oxide or $MgO$ and similarly with the other elements reported, but it is to be understood that the constituents may actually be present in combination with each other or with some other ingredient of the composition. The term "5% iron oxide" or "iron, calculated as iron oxide," for instance, is intended to mean that a chemical analysis of the material under consideration would show the iron content as 5% expressed as $Fe_2O_3$, although in reality in the fired material as a ferrite of calcium or magnesium, or in some other form.

Having now described the invention, what is claimed is:

1. Process for producing deadburned dolomite from finely divided starting materials which comprises admixing from about 5% to about 10% by weight of iron oxide, from about 3.5% to about 7.5% active magnesia, and the remainder dolomite of a particle size substantially all passing 20 mesh, adding thereto a tempering amount of water, forming said admixture with water into shapes, treating said shapes with carbon dioxide-containing gas at a temperature of from 60° C. to 300° C. until dried and hardened, and firing said hardened shapes to deadburn.

2. Process for producing deadburned dolomite from finely divided starting materials which comprises admixing from about 5% to about 10% by weight of iron oxide, from about 3.5% to about 7.5% active magnesia, and the remainder dolomite of a particle size substantially all passing 20 mesh, nodulizing while subjecting to a rolling motion and spraying with water, treating the nodules so obtained with carbon dioxide-containing gas at a temperature at from 60° C. to 300° C. until dried and hardened, and firing said hardened nodules to deadburn.

3. Process for producing deadburned dolomite from finely divided starting materials which comprises admixing from about 5% to about 10% by weight of iron oxide, from about 3.5% to about 7.5% active magnesia, and the remainder dolomite of a particle size substantially all passing 20 mesh and at least 50% thereof passing 200 mesh, nodulizing while subjecting to a rolling motion and spraying with water, treating the nodules so obtained with a carbon dioxide-containing gas at a temperature of from 60° C. to 300° C. until dried and hardened, and firing said hardened nodules to deadburn.

4. A process as in claim 3 wherein the iron oxide is pyrites sinter.

5. A process as in claim 3 wherein the iron oxide is of such particle size that at least 90% passes 100 mesh.

6. A process for producing deadburned dolomite from finely divided starting materials which comprises admixing from about 5% to about 10% by weight of iron oxide and, as binder, about 2.5% of calcined dolomite and about 3.5% of active magnesia, said calcined dolomite and said active magnesia being of such particle size that at least 80% passes 200 mesh, and the remainder dolomite of particle size substantially all passing 20 mesh and at least 50% passing 200 mesh, nodulizing while subjecting to a rolling motion and spraying with water, treating the nodules so obtained with a carbon dioxide-containing gas at a temperature of from 60° C. to 250° C. until dried and hardened, and firing said hardened nodules to deadburn.

7. Process for producing deadburned dolomite from finely divided starting materials which comprises admixing from about 5% to about 10% by weight of iron oxide of such particle size that at least 90% passes 100 mesh, and from about 3.5% to about 7.5% of magnesia having an iodine number of from about 15 to about 30 and of such particle size that at least 80% passes 200 mesh, and the remainder dolomite of particle size substantially all passing 20 mesh and at least 50% passing 200 mesh, nodulizing while subjecting to a rolling motion and spraying with water, treating the nodules so obtained with a carbon dioxide-containing gas at a temperature of from 60° C. to 250° C. until dried and hardened, and firing said hardened nodules to deadburn.

8. A process as in claim 7 wherein said carbon dioxide-containing gas is stack gas issuing from a zone wherein dolomite is being calcined.

9. A process as in claim 7 wherein said nodules are treated with a gas containing from 12% to 28% of carbon dioxide.

10. Process as in claim 7 wherein said nodules are treated with said carbon dioxide-containing gas for at least one hour.

11. Process as in claim 7 wherein said hardened and dried nodules are fired at a temperature of from 1650° C. to 1800° C.

12. Deadburned dolomite shaped particles, each particle comprising a fired agglomerate of a uniform admixture of burned dolomite, from 5% to 10% iron oxide and from 3.5% to 7.5% magnesia.

ARTHUR W. VETTEL.

REFERENCES CITED

The following references are of record in the file of this patent:

UNITED STATES PATENTS

| Number | Name | Date |
|---|---|---|
| 1,238,020 | Kennedy | Aug. 21, 1917 |
| 2,253,955 | Hebbe et al. | Aug. 26, 1941 |
| 2,517,790 | Hughey | Aug. 8, 1950 |